United States Patent
Du et al.

(10) Patent No.: US 10,863,206 B2
(45) Date of Patent: Dec. 8, 2020

(54) CONTENT-WEIGHTED DEEP RESIDUAL LEARNING FOR VIDEO IN-LOOP FILTERING

(71) Applicant: Alibaba Group Holding Limited, Grand Cayman (KY)

(72) Inventors: Yizin Du, Bellevue, WA (US); Jian Lou, Bellevue, WA (US); Yu-Chen Sun, Bellevue, WA (US)

(73) Assignee: Alibaba Group Holding Limited, Grand Cayman (KY)

(*) Notice: Subject to any disclaimer, the term of this patent is extended or adjusted under 35 U.S.C. 154(b) by 102 days.

(21) Appl. No.: 16/184,842

(22) Filed: Nov. 8, 2018

(65) Prior Publication Data

US 2020/0154145 A1    May 14, 2020

(51) Int. Cl.
*H04N 19/82* (2014.01)
*G06K 9/62* (2006.01)
*H04N 19/86* (2014.01)

(52) U.S. Cl.
CPC ........... *H04N 19/82* (2014.11); *G06K 9/6228* (2013.01); *G06K 9/6261* (2013.01); *H04N 19/86* (2014.11)

(58) Field of Classification Search
CPC combination set(s) only.
See application file for complete search history.

(56) References Cited

U.S. PATENT DOCUMENTS

| | | | | |
|---|---|---|---|---|
| 7,778,446 B2* | 8/2010 | Yang | ..................... | G06K 9/6257 382/103 |
| 2006/0110062 A1* | 5/2006 | Chiang | .................. | H04N 19/16 382/260 |
| 2015/0078441 A1* | 3/2015 | Han | ..................... | H04N 19/136 375/240.03 |
| 2018/0192046 A1* | 7/2018 | Teo | ......................... | G06N 20/00 |
| 2018/0227585 A1* | 8/2018 | Wang | .................. | H04N 19/119 |
| 2018/0350110 A1* | 12/2018 | Cho | ......................... | G06T 9/004 |
| 2020/0118423 A1* | 4/2020 | Moura | ..................... | G06N 3/08 |
| 2020/0120340 A1* | 4/2020 | Park | ........................ | G06T 9/002 |

OTHER PUBLICATIONS

Dai et al., "A Convolutional Neural Network Approach for Post-Processing in HEVC Intra Coding," CAS Key Laboratory of Technology in Geo-Spatial Information Processing and Application System, University of Science and Technology of China, Hefei, China, Oct. 29, 2016, 12 pages.

Fu et al., "Sample Adaptive Offset in the HEVC Standard," IEEE Transactions on Circuits and Systems for Video Technology, vol. 22, No. 12, Dec. 2012, 10 pages.

Park et al., "CNN-Based In-Loop Filtering for Coding Efficiency Improvement," IEEE, 2016, 5 pages.

* cited by examiner

*Primary Examiner* — Tsung Yin Tsai
(74) *Attorney, Agent, or Firm* — Lee & Hayes, P.C.

(57) ABSTRACT

Systems and methods are provided for improving filtering performance and Bjøntegaard-Delta (BD) rate savings for video processing. In addition to computing the artifacts between a given compressed image and a restored clean image after filtering using Deep Residual Learning (DRL) for recovering the residual between input and output, filtering strength of a loop filter may be controlled by the content of the region of the image, such that, in more important areas, such as the face and edges, the filtering strength may be increased while in less important areas, such as textures and backgrounds, the filtering strength may be decreased.

20 Claims, 6 Drawing Sheets

CONTENT-WEIGHTED DEEP RESIDUAL LEARNING FOR VIDEO IN-LOOP FILTERING

BACKGROUND

Loop filtering is an important component in the High Efficiency Video Coding (HEVC) and is designed to remove compression artifacts and improve visual quality of a video. Traditional loop filters in the HEVC, such as deblocking filters, have a limited performance with respect to filtering accuracy.

The current video coding standard HEVC, or H.265 which is the successor of H.264, can reduce 50% bit-rate while maintaining the same image quality compared to the H.264. However, because the HEVC utilizes a lossy compression scheme, the resulting image contains some noticeable artifacts especially under a low bit-rate. For example, a blocked-based compression mechanism often yields blocking artifacts, which are located at the border of blocks. Image blurriness is another type of artifacts due to high frequency information loss during the compression. In other words, the quality of an image is degraded by the artifacts generated by the compression process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to improving video coding efficiency, and more specifically to improving filtering performance and Bjøntegaard-Delta (BD) rate savings.

In the HEVC, two artifact removing filters, or in-loop filters, a deblocking filter (DF) and a sample adaptive offset (SAO) may be utilized. The DF may be designed to remove blocking artifacts along the boundaries of blocks, and the SAO may be designed to reduce sample distortion. Using the DF and SAO together may reduce the bit-rate and improve both subjective quality and objective quality, where the subjective quality refers to the visual quality, and the objective quality refers to measured common performance metrics such as pixel-to-noise-ratio (PSNR).

Deep learning may be one of the most powerful tools in the field of computer vision, which aims to use machines to solve vision-related problems, such as image denoising, image super-resolution, and object detection and recognition. Deep learning refers to building a network composed of large number of neurons, mimicking a brain neural system of humans with each neuron having weight and bias used to convolve with input, produce feature maps, and generate output at the end of the network. Deep learning may be implemented in many new areas, including loop filtering in video coding, which aims to remove artifacts in an image or a video.

The relationship among the original image, the compressed image, and the additive artifacts, which may also be referred to as residual, may be expressed as:

$$y = x + a \qquad (1)$$

where y is the compressed image, x is the original image, and a is the residual. In machine learning, recovering the residual from input may be referred to as Deep Residual Learning (DRL), which may compute the artifacts within a given compressed image to restore a clean image after filtering.

Contents within an image and/or video may differ significantly, for example, edges compared to textures, human faces compared to human bodies, foregrounds compared to backgrounds, etc. Instead of applying a uniform compression rate over an entire image, different compression rates, controlled by a quantization parameter (QP), may be applied to different contents within the image. For example, people may pay more attention to a human face rather than the body and environmental background in a portrait photo. Thus, it may be reasonable to use lower QPs in the face area, and higher QPs in the rest of the photo. By using the lower QPs in the face area and higher QPs in the rest of the photo, the visual quality of the facial area may be ensured while reducing bit-rate as higher QPs are used in the non-facial area.

Filtering strength of a weighted loop filter may be controlled by the content of the region. For example, in more important areas, such as the face and edges, the filtering strength may be increased while in less important areas, such as textures and backgrounds, the filtering strength may be decreased.

Figure 1:
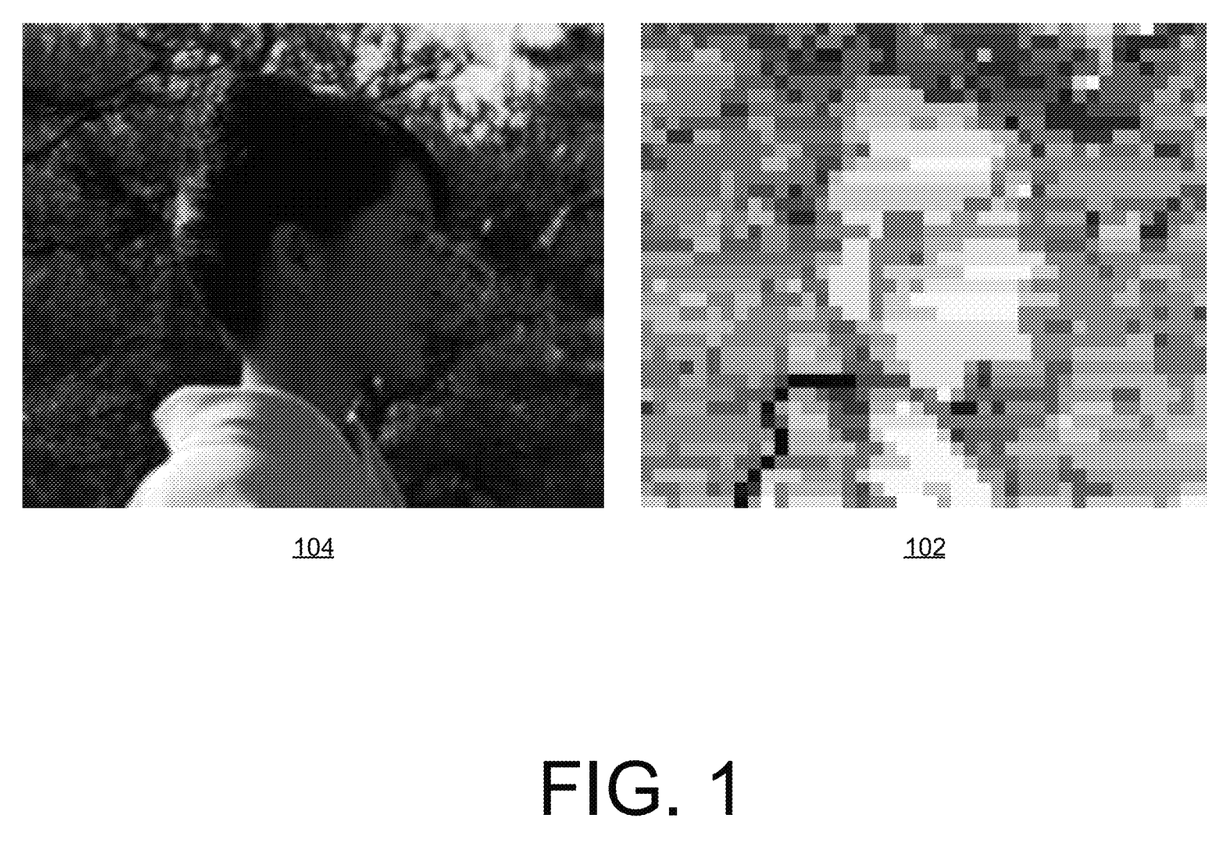
FIG. 1 illustrates an example content weight distribution of an image.

FIG. 1 illustrates an example content weight distribution 102 of an image 104.

Different brightness levels (gray scale) shown in the content weight distribution 102 represent different weights in the filtering process of the image 104. This information may then be utilized by a content-weighted model to control the filtering strength.

Figure 2:
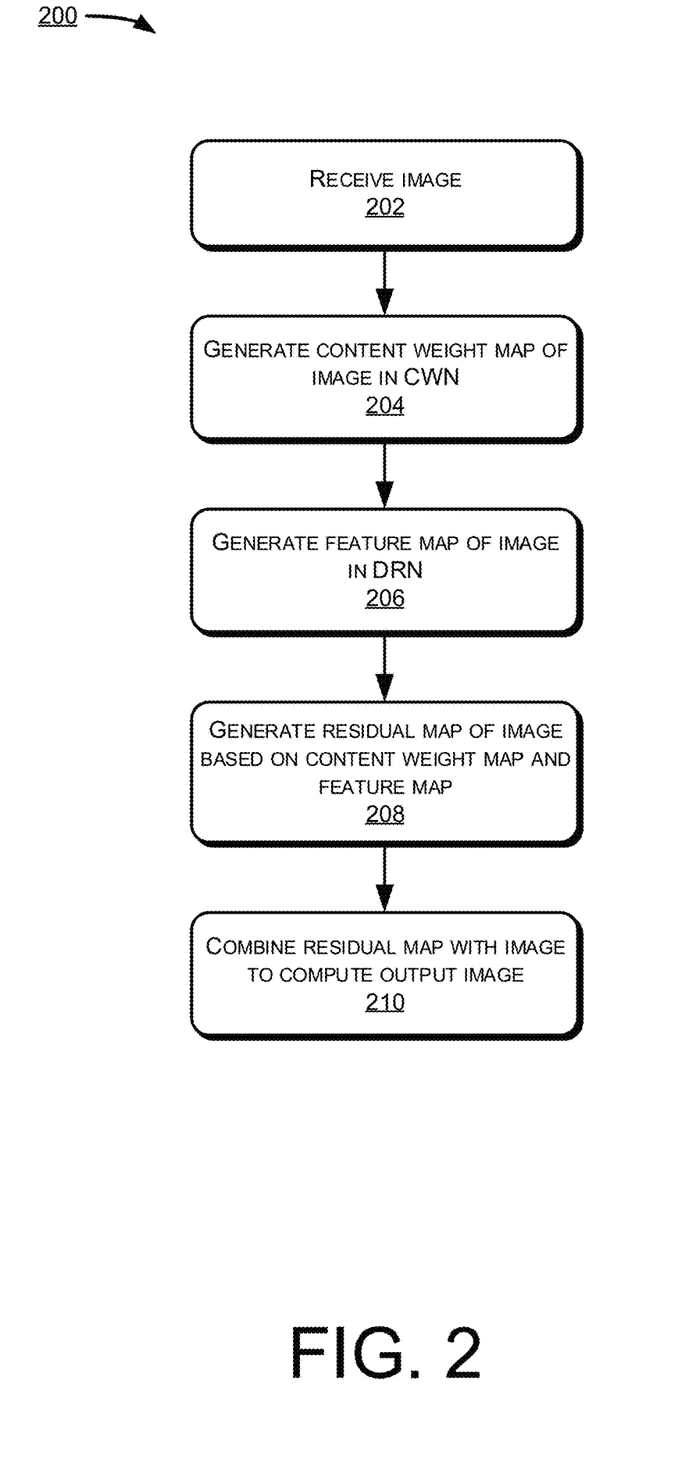
FIG. 2 illustrates an example process of a content-weighted deep residual learning system with deep residual learning.

FIG. 2 illustrates an example process 200 of a content-weighted deep residual learning system (loop filtering system) with deep residual learning.

At block 202, the loop filtering system may receive an image to be processed. At block 204, the loop filtering system may generate a content weight map of the image in a content weight network (CWN) and generate a feature map of the image in a deep residual network (DRN) at block 206. Based on the content weight map and the feature map, the loop filtering system may generate a residual map of the image at block 208 and may then combine the residual map with the image to compute an output image at block 210.

Figure 3:
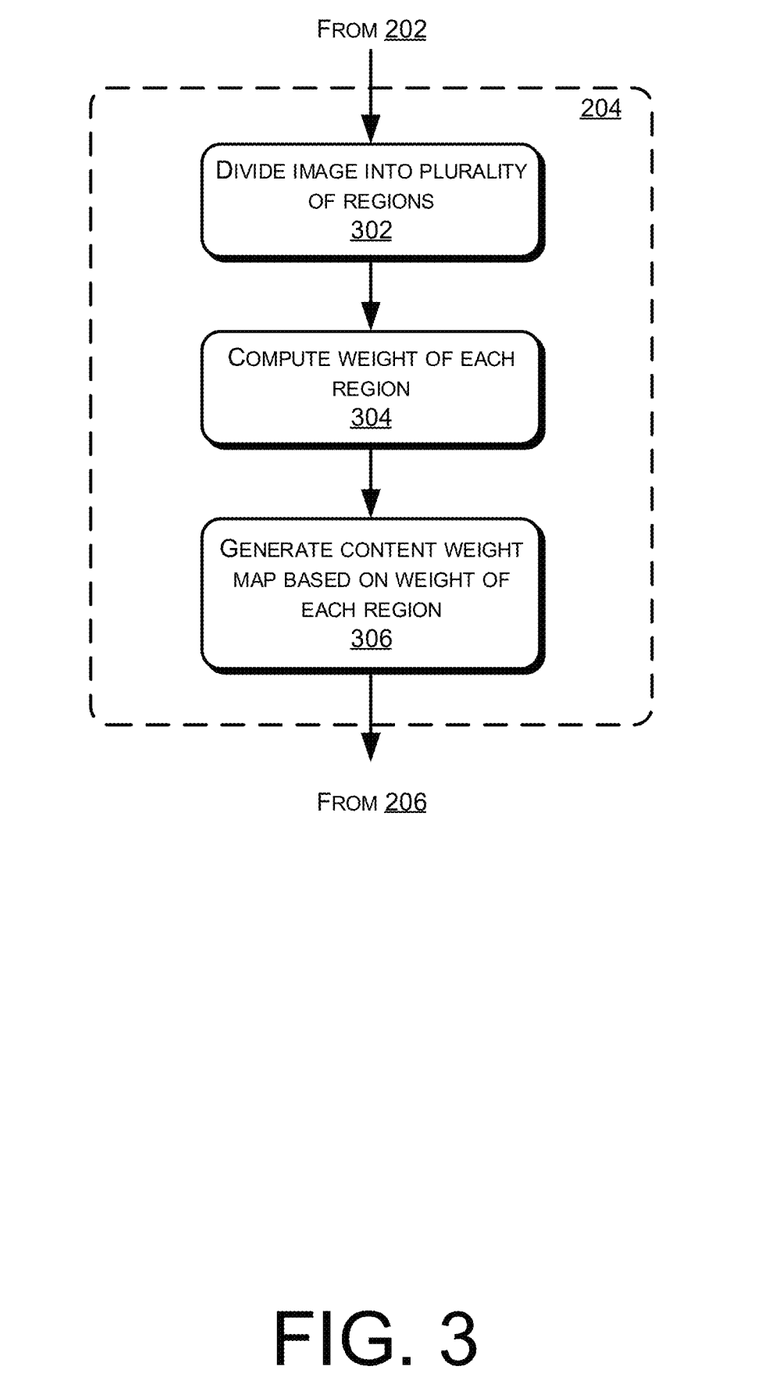
FIG. 3 illustrates an example process of generating a content weight map.

FIG. 3 illustrates an example process of generating a content weight map of block 204 in FIG. 2.

The loop filtering system may first divide the received image into a plurality of regions at block 302 and compute a weight of each region of the plurality of regions at block 304. The weight of each region of the plurality of regions may be computed by determining a corresponding feature of each region, then computing the weight of each region based on the corresponding feature. For each region, the corresponding feature may be a level of details required for the region for the output image. For example, in a portrait photograph image, it may be desirable to include more details in the regions that include a face than the background. It may also be desirable to include more details in the regions that include an edge where a transition from one type to another, for example a book on a table, than a single-colored wall. The corresponding feature may also include one or more of quantization parameters, motion vectors, and coding unit partition information.

The loop filtering system may then generate the content weight map of the image based on the weight of each region of the plurality of regions at block 306. An example of the content weight map shown in FIG. 1 provides different brightness levels (gray scale) shown in the content weight distribution 102 representing different weights in the filtering process of the image 104.

Figure 4:
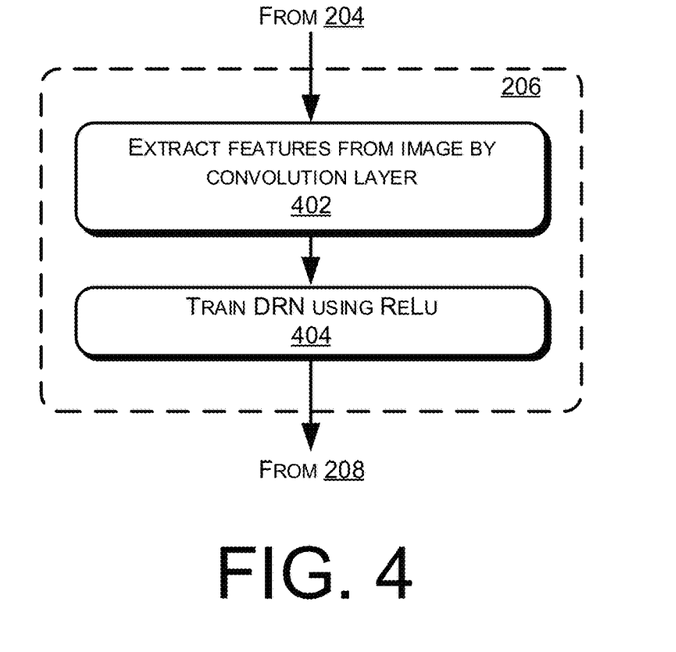
FIG. 4 illustrates an example process of generating a feature map.

FIG. 4 illustrates an example process of generating a feature map of block 206 in FIG. 2.

To generate the feature map of the image, the loop filtering system may extract features from the image by a convolutional layer at block 402 and train the DRN using a rectified linear unit (ReLu) layer at block 404. The ReLu layer is a non-linear, or activation, layer, and may perform max(0, x) operations on input values associated with the extracted features from the convolution layer and aide in speeding up the training and testing of the DRN.

The loop filtering system may include more than one pair of convolutional and ReLu layers (layer pair), and an output from a layer pair may be used as an input to a subsequent layer pair.

Figure 5:
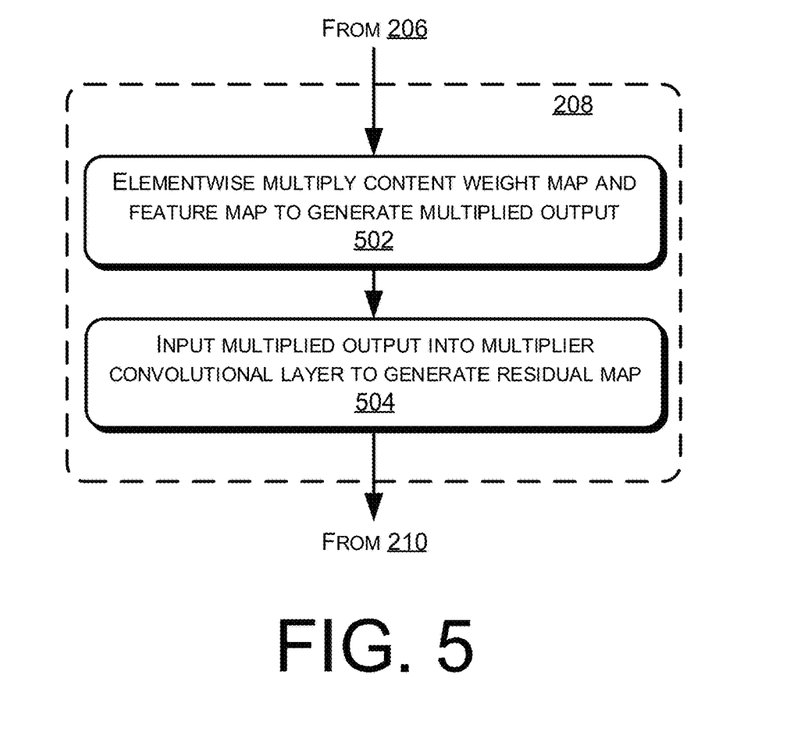
FIG. 5 illustrates an example process of generating a residual map.

FIG. 5 illustrates an example process of generating a residual map of block 208 in FIG. 2.

To generate the residual map of the image based on the content weight map and the feature map, the loop filtering system may elementwise multiply the content weight map and the feature map in a multiplier to generate a multiplied output at block 502, and may input the multiplied output into a multiplier convolutional layer in the multiplier to generate the residual map of the image at block 504.

Referring back to block 210 in FIG. 2, the loop filtering system may combine the residual map with the image by elementwise summing the residual map to the image to compute the output image.

Figure 6:
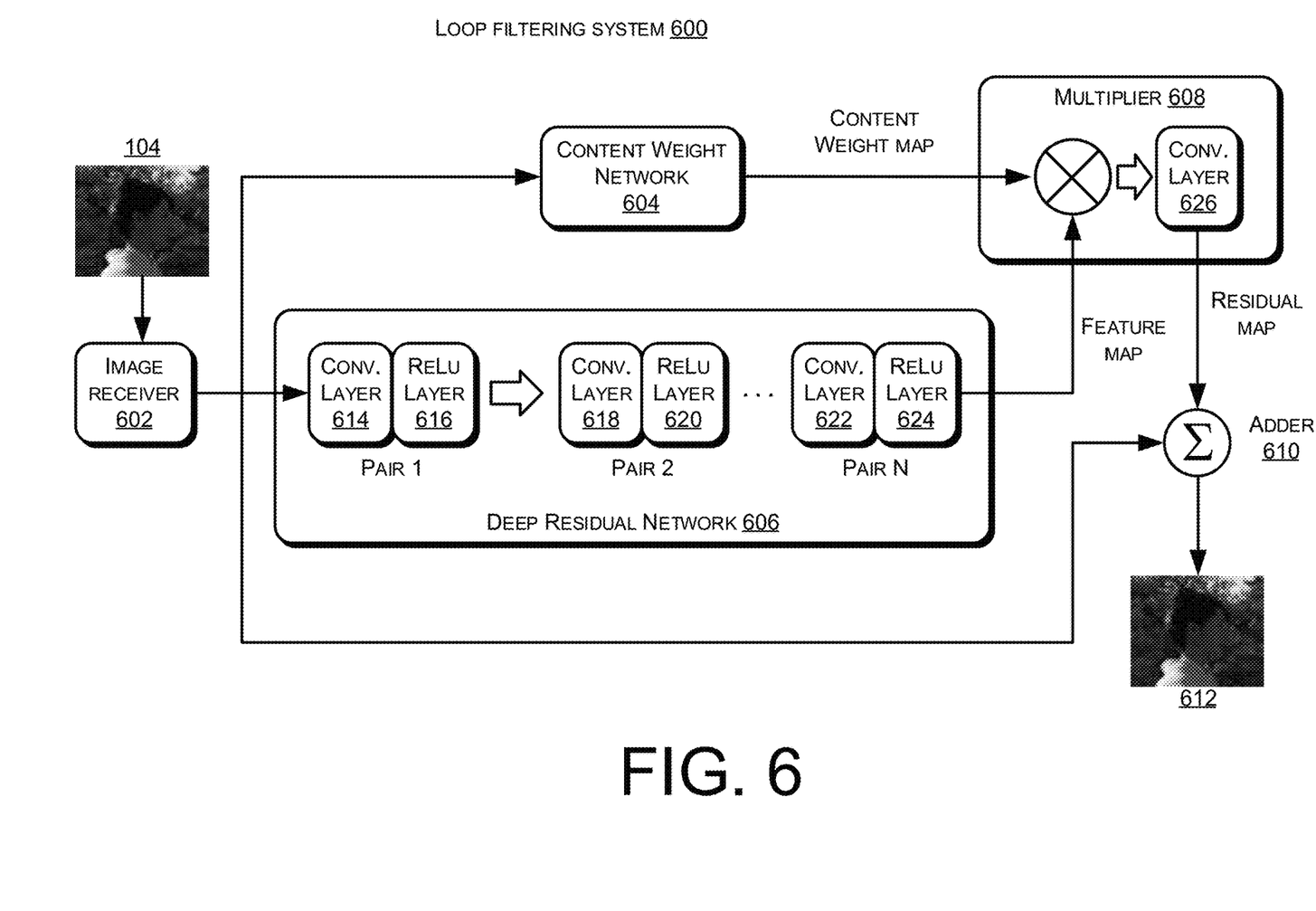
FIG. 6 illustrates an example block diagram of a content-weighted deep residual learning system with deep residual learning.

FIG. 6 illustrates an example block diagram of a content-weighted deep residual learning system 600 with deep residual learning (loop filtering system 600).

The loop filtering system 600 may comprise an image receiver 602 configured to receive an image, such as the image 104 in FIG. 1, and a content weight network (CWN) 604, which may be coupled to the image receiver 602 and configured to receive the image 104 from the image receiver 106 to generate a content weight map of the image 104. A deep residual network (DRN) 606 may also be coupled to the image receiver 602 and configured to receive the image 104 from the image receiver 602 to generate a feature map of the image. A multiplier 608 may be coupled to the CWN 604 and the DRN 606 and configured to generate a residual map of the image 104 based on the content weight map and the feature map. An adder 610 may be coupled to the image receiver 602 and the multiplier 608 and configured to receive the image 104 from the image receiver and to combine the residual map with the image 104 to compute an output image 612.

The CWN 604 may be further configured to generate the content weight map of the image by dividing the image 104 into a plurality of regions, computing a weight of each region of the plurality of regions, and generating the content weight map of the image based on the weight of each region of the plurality of regions. Computing the weight of each region of the plurality of regions may include determining a corresponding feature of each region of the plurality of regions and computing the weight of each region of the plurality of regions based on the corresponding feature. For each region, the corresponding feature may be a level of details required for the region for the output image. For example, in a portrait photograph image, it may be desirable to include more details in the regions that include a face than the background. It may also be desirable to include more details in the regions that include an edge where a transition from one type to another, for example a book on a table, than a single-colored wall. The corresponding feature may also include one or more of quantization parameters, motion vectors, and coding unit partition information. The content weight map of the image 104 may then be generated based on the weight of each region of the plurality of regions. An example of the content weight map shown in FIG. 1 provides different brightness levels (gray scale) shown in the content weight distribution 102 representing different weights in the filtering process of the image 104.

The DRN 606 may comprise a layer pair including a convolutional layer 614 configured to extract features from the image 104 and a rectified linear unit (ReLu) layer 616 coupled to the convolutional layer 614. The ReLu layer 616 may be a non-linear, or activation, layer, and may perform max(0, x) operations on input values associated with the extracted features from the convolution layer 614 and aide in speeding up the training and testing of the DRN 606.

The convolutional layer 614 and the ReLu layer 616 may form a first layer pair, Pair 1, and its output may be used as an input to a subsequent pair, Pair 2 with a convolutional layer 618 and a ReLu layer 620. There may be multiple layer pairs in the DRN 606. In this example, N layer pairs, with Pair N having a convolutional layer 622 and a ReLu layer 624, are shown.

The multiplier 608 may be configured to elementwise multiply the content weight map and the feature map to generate a multiplied output, and may further comprise a multiplier convolutional layer 626, which may receive the multiplied output to generate the residual map of the image 104. The adder 610 may be further configured to combine the residual map with the image by elementwise summing the residual map to the image to compute the output image 612.

Figure 7:
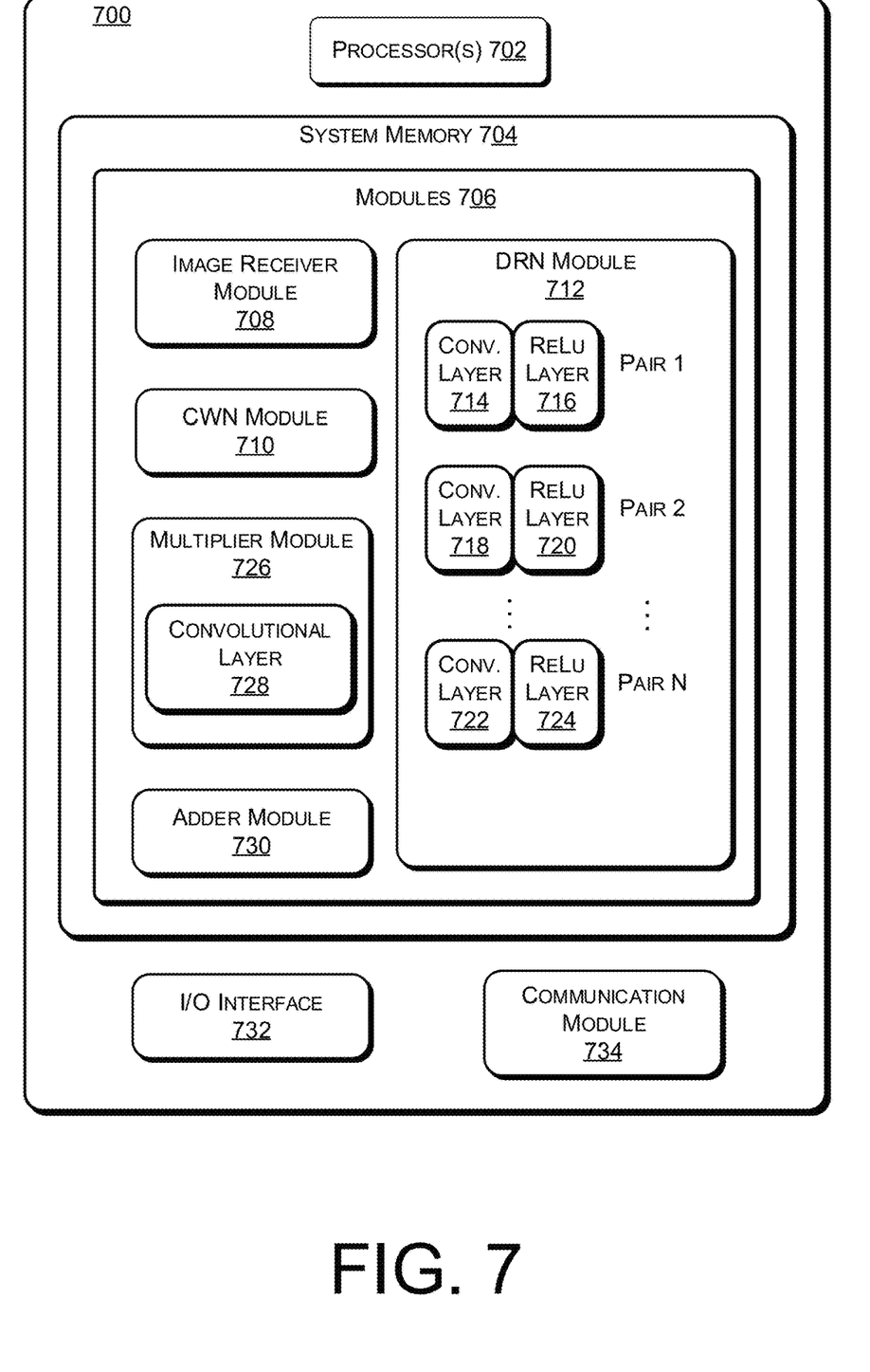
FIG. 7 illustrates an example system for implementing the processes and methods for a content-weighted deep residual learning system with deep residual learning.

FIG. 7 illustrates an example system 700 for implementing the processes and methods described above for a content-weighted deep residual learning system with deep residual learning.

The techniques and mechanisms described herein may be implemented by multiple instances of the system 700 as well as by any other computing device, system, and/or environment. The system 700 shown in FIG. 7 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 700 may include one or more processors 702 and system memory 704 communicatively coupled to the processor(s) 702. The processor(s) 702 may execute one or more modules and/or processes to cause the processor(s) 702 to perform a variety of functions. In some embodiments, the processor(s) 702 may include a central processing unit (CPU), a graphics processing unit (GPU), both CPU and GPU, or other processing units or components known in the art. Additionally, each of the processor(s) 702 may possess its own local memory, which also may store program modules, program data, and/or one or more operating systems.

Depending on the exact configuration and type of the system 700, the system memory 704 may be volatile, such as RAM, non-volatile, such as ROM, flash memory, miniature hard drive, memory card, and the like, or some combination thereof. The system memory 704 may include one or more computer-executable modules (modules) 706 that are executable by the processor(s) 702.

The modules 706 may include, but are not limited to, an image receiver module 708 configured to receive an image, a content weight network (CWN) module 710 coupled to the image receiver module 708. The CWN module 710 may be configured to receive the image from the image receiver module 708 to generate a content weight map of the image. The CWN module 710 may be further configured to generate the content weight map of the image by assigning a plurality of regions to the image, computing a weight of each region of the plurality of regions, and generating the content weight map of the image based on the weight of each region of the plurality of regions. Computing the weight of each region of the plurality of regions may include determining a corresponding feature of each region of the plurality of regions, and computing the weight of each region of the plurality of regions based on the corresponding feature. The corresponding feature of each region of the plurality of regions may include a level of details required for the corresponding region for the output image, quantization parameters, motion vectors, or coding unit partition information. An example of the content weight map shown in FIG. 1 provides different brightness levels (gray scale) shown in the content weight distribution 102 representing different weights in the filtering process of the image 104.

The modules 706 may further include a deep residual network (DRN) module 712, which may be coupled to the image receiver module 708 and be configured to receive the image from the image receiver module 708 to generate a feature map of the image. The DRN module 712 may comprises a layer pair including a convolutional layer 714 configured to extract features from the image, and a rectified linear unit (ReLu) layer 716 coupled to the convolutional layer 714. The ReLu layer 716 may be a non-linear, or activation, layer, and may perform max(0, x) operations on input values associated with the extracted features from the convolution layer 716 and aide in speeding up the training and testing of the DRN module 712. The convolutional layer 714 and the ReLu layer 716 may form a first layer pair, Pair 1, and its output may be used as an input to a subsequent pair, Pair 2 with a convolutional layer 718 and a ReLu layer 720. There may be multiple layer pairs in the DRN module 712. In this example, N layer pairs, with Pair N having a convolutional layer 722 and a ReLu layer 724, are shown.

The modules 706 may further include a multiplier module 726, which may be coupled to the CWN module 710 and be configured to generate a residual map of the image based on the content weight map and the feature map. The multiplier module 726 may comprise a multiplier convolutional layer 728 and be configured to elementwise multiply the content weight map and the feature map to generate a multiplied output, and input the multiplied output into the multiplier convolutional layer 728 to generate the residual map of the image, The modules 706 may further include an adder module 730 coupled to the image receiver module 708 and the multiplier module 716 and be configured to receive the image and to combine the residual map with the image to compute an output image by elementwise summing the residual map to the image to compute the output image.

The system 700 may additionally include an input/output (I/O) interface 732 for receiving data and inputs associated with processing of the image 104. The system 700 may also include a communication module 734 allowing the system 700 to communicate with other devices (not shown) over a network (not shown). The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 2-7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

A. A method comprising: receiving an image, generating a content weight map of the image in a content weight network (CWN), generating a feature map of the image in a deep residual network (DRN), generating a residual map of the image based on the content weight map and the feature map, and combining the residual map with the image to compute an output image.

B. The method as paragraph A recites, wherein generating the content weight map of the image includes dividing the image into a plurality of regions, computing a weight of each region of the plurality of regions, and generating the content weight map of the image based on the weight of each region of the plurality of regions.

C. The method as paragraph B recites, wherein computing the weight of each region of the plurality of regions includes determining a corresponding feature of each region of the plurality of regions, and computing the weight of each region of the plurality of regions based on the corresponding feature.

D. The method as paragraph C recites, wherein the corresponding feature of each region of the plurality of regions includes one of a level of details required for the corresponding region for the output image, quantization parameters, motion vectors, and coding unit partition information.

E. The method as paragraph A recites, wherein generating the feature map of the image includes extracting features from the image by a convolutional layer, and training the DRN using a rectified linear unit (ReLu) layer.

F. The method as paragraph E recites, wherein the convolutional layer and the ReLu layer form a first layer pair of a plurality of layer pairs, and an output from a layer pair is used as an input for a subsequent layer pair.

G. The method as paragraph A recites, wherein generating the residual map of the image based on the content weight map and the feature map include elementwise multiplying the content weight map and the feature map to generate a multiplied output, and inputting the multiplied output into a multiplier convolutional layer to generate the residual map of the image.

H. The method as paragraph A recites, wherein combining the residual map with the image to compute the output image includes elementwise summing the residual map to the image to compute the output image.

I. A loop filtering system comprising: an image receiver configured to receive an image, a content weight network (CWN) coupled to the image receiver, the CWN configured to receive the image from the image receiver to generate a content weight map of the image, a deep residual network (DRN) coupled to the image receiver, the DRN configured to receive the image from the image receiver to generate a feature map of the image, a multiplier coupled to the CWN and the DRN, the multiplier configured to generate a residual map of the image based on the content weight map and the feature map, and an adder coupled to the image receiver and the multiplier, the adder configured to receive the image and to combine the residual map with the image to compute an output image.

J. The loop filtering system as paragraph I recites, wherein the CWN is further configured to generate the content weight map of the image by dividing the image into a plurality of regions, computing a weight of each region of the plurality of regions, and generating the content weight map of the image based on the weight of each region of the plurality of regions.

K. The loop filtering system as paragraph J recites, wherein computing the weight of each region of the plurality of regions includes determining a corresponding feature of each region of the plurality of regions, and computing the weight of each region of the plurality of regions based on the corresponding feature.

L. The loop filtering system as paragraph K recites, wherein the corresponding feature of each region of the plurality of regions includes one of a level of details required for the corresponding region for the output image, quantization parameters, motion vectors, and coding unit partition information.

M. The loop filtering system as paragraph I recites, wherein the DRN comprises a layer pair including a convolutional layer configured to extract features from the image, and a rectified linear unit (ReLu) layer coupled to the convolutional layer, the ReLu layer configured to train the DRN, N. The loop filtering system as paragraph M recites, wherein the layer pair is a first layer pair of a plurality of layer pairs, and an output from a layer pair is used as an input for a subsequent layer pair.

O. The loop filtering system as paragraph I, wherein the multiplier comprises a multiplier convolutional layer, the multiplier further configured to elementwise multiply the content weight map and the feature map to generate a multiplied output, and input the multiplied output into the multiplier convolutional layer to generate the residual map of the image.

P. The loop filtering system as paragraph I, wherein the adder is further configured to combine the residual map with the image by elementwise summing the residual map to the image to compute the output image.

Q. A computer-readable storage medium storing computer-readable instructions executable by one or more processors, that when executed by the one or more processors, cause the one or more processors to perform operations comprising: receiving an image; generating a content weight map of the image in a content weight network (CWN), generating a feature map of the image in a deep residual network (DRN), generating a residual map of the image based on the content weight map and the feature map, elementwise multiplying the content weight map and the feature map to generate a multiplied output, inputting the multiplied output into a multiplier convolutional layer to generate the residual map of the image, and elementwise summing the residual map to the image to compute the output image.

R. The computer-readable storage medium as paragraph Q recites, wherein generating the content weight map of the image includes dividing the image into a plurality of regions, computing a weight of each region of the plurality of regions, and generating the content weight map of the image based on the weight of each region of the plurality of regions.

S. The computer-readable storage medium as paragraph R recites, wherein computing the weight of each region of the plurality of regions includes determining a corresponding feature of each region of the plurality of regions, and computing the weight of each region of the plurality of regions based on the corresponding feature.

T. The computer-readable storage medium as paragraph S recites, wherein the corresponding feature of each region of the plurality of regions includes one of a level of details required for the corresponding region for the output image, quantization parameters, motion vectors, and coding unit partition information.

U. A loop filtering system comprising: one or more processors, memory coupled to the one or more processors, the memory storing computer-executable modules, that when executed by the one or more processors, perform associated operations, the computer-executable modules including: an image receiver module configured to receive an image, a content weight network (CWN) module coupled to the image receiver module, the CWN module configured to receive the image from the image receiver module to generate a content weight map of the image; a deep residual network (DRN) module coupled to the image receiver module, the DRN module configured to receive the image from the image receiver module to generate a feature map of the image; a multiplier module coupled to the CWN module and the DRN module, the multiplier module configured to generate a residual map of the image based on the content weight map and the feature map; and an adder module coupled to the image receiver module and the multiplier module, the adder module configured to receive the image and to combine the residual map with the image to compute an output image.

V. The loop filtering system as paragraph U recites, wherein the CWN module is further configured to generate the content weight map of the image by dividing the image into a plurality of regions, computing a weight of each region of the plurality of regions, and generating the content weight map of the image based on the weight of each region of the plurality of regions.

W. The loop filtering system as paragraph V recites, wherein computing the weight of each region of the plurality of regions includes determining a corresponding feature of each region of the plurality of regions, and computing the weight of each region of the plurality of regions based on the corresponding feature.

X. The loop filtering system as paragraph W recites, wherein the corresponding feature of each region of the plurality of regions includes one of a level of details required for the corresponding region for the output image, quantization parameters, motion vectors, or coding unit partition information Y. The loop filtering system as paragraph U recites, wherein the DRN module comprises a layer pair including a convolutional layer configured to extract features from the image, and a rectified linear unit (ReLu) layer coupled to the convolutional layer, the ReLu layer configured to train the DRN.

Z. The loop filtering system as paragraph Y recites, wherein the layer pair is a first layer pair of a plurality of layer pairs, and an output from a layer pair is used as an input for a subsequent layer pair.

AA. The loop filtering system as paragraph U, wherein the multiplier module comprises a multiplier convolutional layer, the multiplier module further configured to elementwise multiply the content weight map and the feature map to generate a multiplied output, and input the multiplied output into the multiplier convolutional layer to generate the residual map of the image.

AB. The loop filtering system as paragraph U recites, wherein the adder module is further configured to combine the residual map with the image by elementwise summing the residual map to the image to compute the output image.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving an image;
generating a content weight map of the image in a content weight network (CWN);
generating a feature map of the image in a deep residual network (DRN);
generating a residual map of the image based on the content weight map and the feature map; and
combining the residual map with the image to compute an output image.
2. The method of claim 1, wherein generating the content weight map of the image includes:
dividing the image into a plurality of regions;
computing a weight of each region of the plurality of regions; and
generating the content weight map of the image based on the weight of each region of the plurality of regions.
3. The method of claim 2, wherein computing the weight of each region of the plurality of regions includes:
determining a corresponding feature of each region of the plurality of regions; and
computing the weight of each region of the plurality of regions based on the corresponding feature.
4. The method of claim 3, wherein the corresponding feature of each region of the plurality of regions includes one of:
a level of details required for the corresponding region for the output image,
quantization parameters,
motion vectors, and
coding unit partition information.
5. The method of claim 1, wherein generating the feature map of the image includes:
extracting features from the image by a convolutional layer, and
training the DRN using a rectified linear unit (ReLu) layer.

6. The method of claim 5, wherein the convolutional layer and the ReLu layer form a first layer pair of a plurality of layer pairs, and an output from a layer pair is used as an input for a subsequent layer pair.

7. The method of claim 1, wherein generating the residual map of the image based on the content weight map and the feature map include:
- elementwise multiplying the content weight map and the feature map to generate a multiplied output, and
- inputting the multiplied output into a multiplier convolutional layer to generate the residual map of the image.

8. The method of claim 1, wherein combining the residual map with the image to compute the output image includes:
- elementwise summing the residual map to the image to compute the output image.

9. A loop filtering system comprising:
- an image receiver configured to receive an image;
- a content weight network (CWN) coupled to the image receiver, the CWN configured to receive the image from the image receiver to generate a content weight map of the image;
- a deep residual network (DRN) coupled to the image receiver, the DRN configured to receive the image from the image receiver to generate a feature map of the image;
- a multiplier coupled to the CWN and the DRN, the multiplier configured to generate a residual map of the image based on the content weight map and the feature map; and
- an adder coupled to the image receiver and the multiplier, the adder configured to receive the image and to combine the residual map with the image to compute an output image.

10. The loop filtering system of claim 9, wherein the CWN is further configured to generate the content weight map of the image by:
- dividing the image into a plurality of regions;
- computing a weight of each region of the plurality of regions; and
- generating the content weight map of the image based on the weight of each region of the plurality of regions.

11. The loop filtering system of claim 10, wherein computing the weight of each region of the plurality of regions includes:
- determining a corresponding feature of each region of the plurality of regions; and
- computing the weight of each region of the plurality of regions based on the corresponding feature.

12. The loop filtering system of claim 11, wherein the corresponding feature of each region of the plurality of regions includes one of:
- a level of details required for the corresponding region for the output image,
- quantization parameters,
- motion vectors, and
- coding unit partition information.

13. The loop filtering system of claim 9, wherein the DRN comprises a layer pair including:
- a convolutional layer configured to extract features from the image, and
- a rectified linear unit (ReLu) layer coupled to the convolutional layer, the ReLu layer configured to train the DRN.

14. The loop filtering system of claim 13, wherein the layer pair is a first layer pair of a plurality of layer pairs, and an output from a layer pair is used as an input for a subsequent layer pair.

15. The loop filtering system of claim 9, wherein the multiplier comprises a multiplier convolutional layer, the multiplier further configured to:
- elementwise multiply the content weight map and the feature map to generate a multiplied output, and
- input the multiplied output into the multiplier convolutional layer to generate the residual map of the image.

16. The loop filtering system of claim 9, wherein the adder is further configured to combine the residual map with the image by elementwise summing the residual map to the image to compute the output image.

17. A computer-readable storage medium storing computer-readable instructions executable by one or more processors, that when executed by the one or more processors, cause the one or more processors to perform operations comprising:
- receiving an image;
- generating a content weight map of the image in a content weight network (CWN);
- generating a feature map of the image in a deep residual network (DRN);
- generating a residual map of the image based on the content weight map and the feature map;
- elementwise multiplying the content weight map and the feature map to generate a multiplied output;
- inputting the multiplied output into a multiplier convolutional layer to generate the residual map of the image; and
- elementwise summing the residual map to the image to compute the output image.

18. The computer-readable storage medium of claim 17, wherein generating the content weight map of the image includes:
- dividing the image into a plurality of regions;
- computing a weight of each region of the plurality of regions; and
- generating the content weight map of the image based on the weight of each region of the plurality of regions.

19. The computer-readable storage medium of claim 18, wherein computing the weight of each region of the plurality of regions includes:
- determining a corresponding feature of each region of the plurality of regions; and
- computing the weight of each region of the plurality of regions based on the corresponding feature.

20. The computer-readable storage medium of claim 19, wherein the corresponding feature of each region of the plurality of regions includes one of:
- a level of details required for the corresponding region for the output image,
- quantization parameters,
- motion vectors, and
- coding unit partition information.

* * * * *